Aug. 21, 1923.
J. R. KONETSKY
1,465,605
AXLE, SPRING, AND STEERING KNUCKLE ASSEMBLY
Filed Oct. 13, 1919
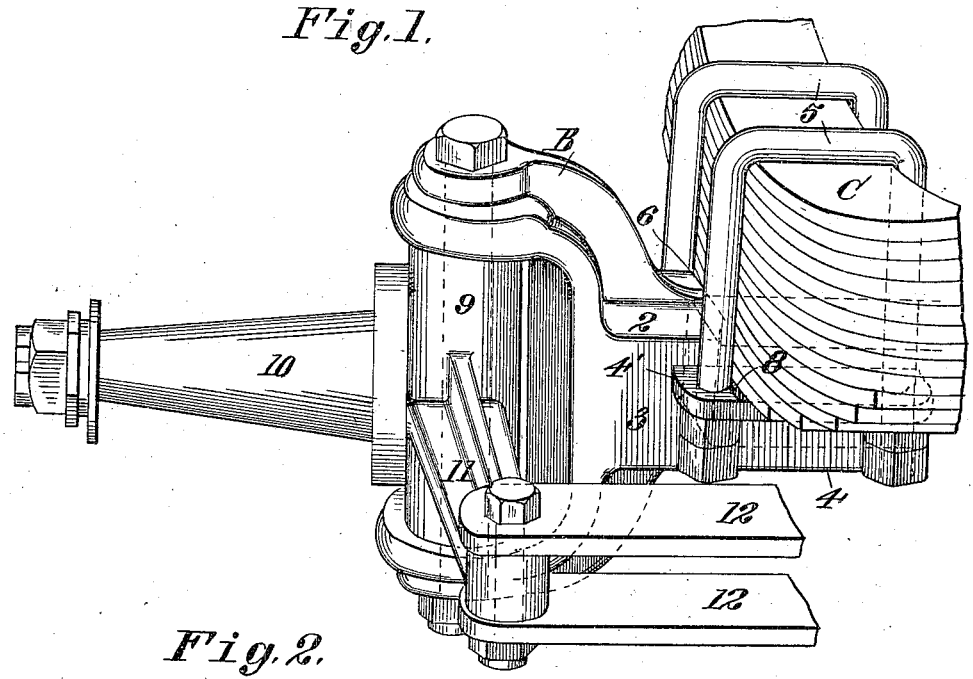
INVENTOR
John R. Konetsky
BY Strong & Townsend
ATTORNEYS Patented Aug. 21, 1923.

1,465,605

UNITED STATES PATENT OFFICE.

JOHN R. KONETSKY, OF SAN FRANCISCO, CALIFORNIA, ASSIGNOR TO RELIANCE TRAILER & TRUCK CO., INC., OF SAN FRANCISCO, CALIFORNIA, A CORPORATION OF CALIFORNIA.

AXLE, SPRING, AND STEERING-KNUCKLE ASSEMBLY.

Application filed October 13, 1919. Serial No. 330,247.

*To all whom it may concern:*

Be it known that I, JOHN R. KONETSKY, a citizen of the United States, residing at the city and county of San Francisco, and State of California, have invented new and useful Improvements in Axle, Spring, and Steering-Knuckle Assemblies, of which the following is a specification.

This invention relates to an axle, spring and steering knuckle structure and assembly for trucks, tractors, trailers and the like.

One of the objects of the present invention is to provide a novel axle, spring and steering knuckle structure and assembly, especially adapted for motor vehicles such as trucks, tractors, trailers and the like, and particularly to provide a built-up structure consisting of several separable parts, to-wit, an axle, a pair of steering knuckle forks, and a pair of springs.

Another object of the invention is to provide a novel fastening means whereby the knuckle forks and springs, together with the axle connecting the same, may be assembled and secured to form a substantial and rigid unit.

Further objects will hereinafter appear.

The invention consists of the parts and the construction, combination and arrangement of parts as hereinafter more fully described and claimed, having reference to the accompanying drawings, in which—

Fig. 1 is a perspective view of the steering knuckle, the fork supporting the same, the spring and the axle.

Fig. 2 is a sectional end view of Fig. 1.

The main purpose of the present invention is to provide a built-up rigid axle structure for the support of steering knuckles at each end thereof and for the reception of springs of the semi-elliptical, or a similar type. It is common practice in the construction of axles to form the axle proper and the steering knuckle forks as a single unit. Such consisting of a central axle section A on each end of which is secured a steering knuckle fork B. The forks here shown are constructed according to the standard practice but they are, in addition thereto, supplied with a socket extension 2 consisting of a pair of side walls 3 in a bottom section 4, for the reception of the axle ends. The socket extension is furthermore provided for the purpose of securing and supporting the springs, indicated at C, and for tying or securing the axle, the steering knuckle forks, and the springs, as a unit, this being accomplished by providing lugs 4' formed integral with the side sections 3 and perforated to receive U-bolts 5. The shape of the socket 2 on each steering knuckle is formed to fit the axle end, in this instance square, and the depth of the socket is such that the upper surface of the axle will project slightly above the surface of the securing lugs 4'. The springs 5 are placed directly on top of the axle ends and are then secured by applying the U-bolts 5 and drawing the same tightly into place, the springs being locked against turning movement on the axle ends by a shoulder 6 formed at the inner end of the socket. These shoulders run parallel with the springs and serve as guides and supports, which positively secure the springs at right angles to the longitudinal center line of the axle and further prevents turning or shifting of either spring. The U-bolts therefore serve several functions; first, that of rigidly securing the springs; secondly, that of securing the steering knuckle forks on the axle ends.

For the purpose of further securing the steering knuckle forks against end-wise or lateral movement on the axle ends, I provide a pin 7, one for each socket. These pins are secured in the bottom portion of the sockets, as shown in Fig. 2, and project into recesses or drilled holes registering therewith and formed in the axle ends. The forks are thus positively secured against end-wise movement and are otherwise secured by means of the U-bolts 5.

I have in this manner provided a built-up axle structure consisting of an axle section, a steering knuckle fork on each end thereof, springs supported partially by the axle ends and the steering knuckle forks, and means, to-wit, U-bolts, carried by each steering knuckle fork for securing the several separable parts as an integral and rigid unit. An axle of this character can be cheaply manufactured as the forks may be cast and practically any form of steel bar may be employed to connect the yokes or serve the function of the axle. I therefore do not wish to limit the shape of the socket extension formed on each fork as this should conform to the cross section of the axle employed.

By referring to Fig. 2, it will be seen that the upper surface of the axle projects slightly above the surface of the lugs 4' and the side walls 3 forming the sockets. This is important as it permits the pull of the U-bolts to be transmitted in such a manner that the axle ends are forced down into, and rigidly secured in, the sockets.

The springs are therefore, practically speaking, supported entirely by the axle ends and might, under such conditions, have a tendency to break. To obviate this effect, I place leather pads 8 or shims between the lugs and the springs, thus materially increasing the bearing surface supporting the springs, and to that extent obviating any tendency towards breaking the springs at the point of support, and without any tendency of removing the pressure between the springs, the axle and the sockets connecting the same. The construction of the steering knuckle spindles, shown at 9, the wheel spindles 10, the steering arms 11, and the cross rods 12, do not form any part of the present invention, I therefore do not wish to limit myself to the specific structure shown.

I similarly wish it understood that various changes in form and proportions of the several parts employed may be resorted to within the scope of the appended claims, and that the materials and finish of said parts employed may be such as the experience and judgment of the manufacturer may dictate.

Having thus described my invention, what I claim and desire to secure by Letters Patent is—

1. An axle, spring and steering knuckle assembly comprising a pair of steering knuckle forks, a substantially square axle, a socket member formed on each fork for the reception of the respective axle ends, each socket member comprising a pair of parallel side walls and a bottom section, and said side walls presenting upper surfaces disposed slightly below the upper surface of the axle, a pair of load bearing springs supported on the upper surface of the axle, one in alignment with each socket, a shoulder formed adjacent the inner end of each socket with which the springs engage and align and whereby they are secured against turning movement on the axle ends, U-clamps secured to each socket and straddling the springs, and a pin in each socket entering the axle ends and securing the sockets and forks against endwise movement on the axle ends.

2. An axle, spring and steering knuckle assembly, comprising a pair of steering knuckle forks, a substantially square axle, a socket member formed on each fork for the reception of the respective axle ends, each socket member comprising a pair of parallel side walls and a bottom section, and said side walls comprising upper surfaces disposed slightly below the upper surface of the axle, a pair of lugs formed one on each side of said side walls, and said lugs being perforated, a pair of load bearing springs supported on the upper surface of the axle, one in alignment with each socket, a shoulder formed adjacent the inner end of each socket with which the springs engage and align, and whereby they are secured against turning movement on the axle, a pair of U-shaped clamps straddling each load bearing spring, said U-clamps passing through the perforated lugs and exerting a downward pull on the springs against the axle, thereby securing the axle ends in the respective sockets, and simultaneously securing the springs on the axle, and other means for securing the axle face against endwise movement with relation to the socket.

In testimony whereof I have hereunto set my hand in the presence of two subscribing witnesses.

JOHN R. KONETSKY.

Witnesses:
JOHN H. HERRING,
WM. K. BAUER.